(12) United States Patent
Levin (10) Patent No.: US 7,049,600 B2
(45) Date of Patent: May 23, 2006

(54) SCINTILLATION CRYSTAL DETECTION ARRAYS FOR RADIATION IMAGING DEVICES

(75) Inventor: Craig S. Levin, Encinitas, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 220 days.

(21) Appl. No.: 10/664,768

(22) Filed: Sep. 17, 2003

(65) Prior Publication Data

US 2004/0124360 A1    Jul. 1, 2004

Related U.S. Application Data

(60) Provisional application No. 60/411,613, filed on Sep. 18, 2002.

(51) Int. Cl.
*G01T 1/166* (2006.01)
*G01T 1/20* (2006.01)

(52) U.S. Cl. .................. 250/363.04; 250/366; 250/367

(58) Field of Classification Search ........... 250/370.11, 250/363.02, 363.03, 363.06, 367, 368, 363.04, 250/366

See application file for complete search history.

(56) References Cited

U.S. PATENT DOCUMENTS

| | | | | |
|---|---|---|---|---|
| 4,672,207 A | * | 6/1987 | Derenzo | 250/363.02 |
| 5,009,128 A | * | 4/1991 | Seidel et al. | 477/122 |
| 5,091,650 A | * | 2/1992 | Uchida et al. | 250/366 |
| 5,378,894 A | * | 1/1995 | Akai | 250/368 |
| 6,114,703 A | | 9/2000 | Levin et al. | |
| 6,245,184 B1 | * | 6/2001 | Riedner et al. | 156/247 |
| 2002/0190214 A1 | * | 12/2002 | Wieczorek et al. | 250/367 |

OTHER PUBLICATIONS

Cherry et al., "A Comparison of PET Detector Modules Employing Rectangular and Round Photomultiplier Tubes", IEEE Transactions on Nuclear Science, vol. 42, No. 4, p. 1064-68 (Aug. 1995).

Levin et al., "Initial Studies of a New Detector Design for Ultra-High Resolution Positron Emission Tomography", Nuclear Science Symposium Conference Record, IEEE, p. 1751-55 (Nov. 2002).

Craig S. Levin, "Design of a High Resolution and High Sensitivity Scintillation Crystal Array with Nearly Perfect Light Collection", Nuclear Science Symposium Conference Record, IEEE, p. 48-52 (2002).

(Continued)

*Primary Examiner*—David Porta
*Assistant Examiner*—Faye Polyzos
(74) *Attorney, Agent, or Firm*—Greer, Burns & Crain, Ltd.

(57) ABSTRACT

A radiation imaging device includes scintillation crystal sheets arranged in parallel to each other. Semiconductor photodetector positional detectors read light from large faces of the scintillation crystal sheets to detect interactions in the scintillation crystal sheets and independently provide positional information concerning the interactions relative to at least one axis. The structures of the photodetectors and crystal sheets provide for very small spaces between the sheets.

20 Claims, 11 Drawing Sheets

OTHER PUBLICATIONS

Miyaoka et al., "Performance Characteristics of Micro Crystal Element (MiCE) Detectors", IEEE Transactions on Nuclear Science, vol. 48, No. 4, p. 1403-07 (Aug. 2001).

Pichler et al., "A 4×8 APD Array, Consisting of Two Monolithic Silicon Wafers, Coupled to a 32-Channel LSO Matrix for High-Resolution PET", IEEE Transactions on Nuclear Science, vol. 48, No. 4, p. 1391-96 (Aug. 2001).

Seidel et al., "Experimental Estimates of the Absolute Sensitivity of a Small Animal PET Scanner with Depth-of-Interaction Capability", Nuclear Science Symposium Conference Record, IEEE, p. 21-57-21-59 (Oct. 2000).

Shah et al., "ADP Designs for X-Ray and Gamma Ray Imaging", 2001 IEEE Nuclear Science Symposium.

Shao et al., "Design Studies of a High Resolution PET Detector Using APD Arrays", IEEE Transactions on Nuclear Science, vol. 47, No. 3, p. 1051-57 (Jun. 2000).

Tai et al., "Performance Evaluation of the MicroPET P4: a PET System Dedicated to Animal Imaging", Phys. Med. Biol., vol. 46, No. 7, p. 1845-62 (2001).

Tai et al., "System Design for a 1mm$^3$ Resolution Animal PET Scanner: MicroPET II", Nuclear Science Symposium Conf. Rec., vol. 3, p. 21/52 (Oct. 2000).

Tornai et al., "Positioning and Energy Response of PET Block Detectors with Different Light Sharing Schemes", IEEE Transactions on Nuclear Science, vol. 41, No. 4, p. 1458-63 (Aug. 1994).

* cited by examiner

SCINTILLATION CRYSTAL DETECTION ARRAYS FOR RADIATION IMAGING DEVICES

REFERENCE TO RELATED APPLICATION AND PRIORITY CLAIM

This application is related to pending provisional application Ser. No. 60/411,613 filed on Sep. 18, 2002, and claims priority from that provisional application under 35 U.S.C. §119.

FIELD OF THE INVENTION

The field of the invention is high resolution radiation imaging. An exemplary application of the invention is a Positron Emission Tomography (PET) device.

BACKGROUND OF THE INVENTION

Scintillation crystals are commonly used in non-invasive medical diagnostic techniques that utilize radiation emitting materials. These crystals are noted for their ability to emit pulses of visible light when ionizing radiation, such as gamma radiation, passes therethrough and interacts with atomic nuclei in the crystal. The pulses of emitted light (photons) are then detected by a photodetector device such as a photomultiplier tube (PMT) or a semiconductor photodiode (SPD). The effectiveness of the detector in diagnostic procedures depends on the ability to see and quantify the crystal light flashes with high spatial, spectral, and temporal precision. This, in turn, is dependent on brightness and rapidity of the generated and recorded flash, which are functions of the type and geometry of the scintillation crystal.

Position emission tomography (PET) is an example radiation imaging technology that provides in-vivo, functional information about the molecular biochemistry of a given radio-labeled compound (a.k.a. tracer) introduced into a live subject. The radio-label is a positron emitter. The tomographic imaging is possible through detection and localization of the many associated highly energetic photons emitted. The sensor is typically an array of scintillation crystals. There are essentially three stages of the photon sensing. The entering photon is first absorbed in the scintillation crystal. The crystal gives off a flash of light. This light is collected by a photodetector, which subsequently detects and converts the light into electric charge that is amplified. The result is a robust electric signal with an amplitude that represents the energy of the incoming photon, a location that indicates where the energetic photon came from within the imaging subject, and time stamp that signifies when the event occurred. For high spatial resolution imaging, which will allow one to see very minute structures, PET relies on very accurate localization of the energetic photon emissions. This means the scintillation detector must have very fine position resolution of the entering photons. However, to efficiently absorb the incoming photons, the crystal must also be relatively thick. Efficient absorption of incoming photons is important to allow for high count sensitivity, which translates into good image quality.

In typical commercial devices, there has been a compromise between detector spatial resolution, detection efficiency, and light collection into the photodetector. High light collection is important for creation of robust electronic detector signals for high sensitivity. High light collection is also important for good energy resolution for good photon Compton scatter and random coincidence background rejection capabilities. Scatter and random photon coincidences produces loss of image contrast and should be rejected as much as possible. Efficient light collection is also important for good event timing resolution that further helps to reject random coincidence background.

In typical commercial PET devices spatial resolution is determined by the dimensions of the individual scintillation crystals. Typical commercial nuclear medicine cameras utilize a two-dimensional, discrete or pseudo-discrete array of long, narrow scintillation crystals, which are coupled at a small end to photomultipliers (PMTs) with the opposite small end directed toward the high energy photon source. Positional information is encoded in the crystals, as each crystal indicates a unique X-Y position. The crystals are made long for high gamma-ray stopping power and narrow for high spatial resolution. An intermediate optical coupling medium is necessary in these designs at the scintillation crystal/PMT interface. Crystal surfaces in these designs are treated and coated with reflectors to preferentially direct light through internal reflections into the PMT located at one small end of the scintillation crystal array. Detection sensitivity in the conventional discrete-crystal designs is hampered by coupling of the scintillation crystals to the PMTs. Another type of commercial device used in Nuclear Medicine utilizes a scintillation crystal sheet, with the radiation incident on the large surface of the crystal sheet. Detection by a PMT is on an opposite large surface of the crystal sheet. This configuration is commonly known as a scintillation camera.

The typical commercial PET devices collect emitted light photons at the opposite end from the end at which the radiation of interest is received in the long, narrow crystals. The front as well as the side crystal surfaces include reflective coatings to help alleviate loss of intensity in the scintillation light resulting from the received radiation. However, for very fine crystals in high resolution PET systems only a small fraction of the scintillation light produced in the crystal reaches the photodetector. This light loss problem associated with standard photodetector readout at the end of the scintillating crystal worsens as the crystal is made narrower and longer or has untreated surfaces. This light loss problem together with the low quantum efficiency of the PMT photocathode for detecting the scintillation light produced limits the count efficiency and signal-to-noise ratio of both the crystal decoding scheme used to position and time an annihilation photon event, and the energy (spectral) resolution required to reduce gamma-ray scatter and random coincidence background rates. Good scatter and random photon reduction is an important factor for improving image contrast between true structures of interest and the background present in the resulting PET images.

An additional related problem associated with the conventional end readout is that the light collection efficiency depends on the location within the crystal where light was created and thus, where the radiation interacted. This factor further degrades the energy resolution. Also, there is roughly a 10–15% light loss at the interface between the crystal and PMT due to index of refraction mismatches, further degrading the signal to noise ratio. In a particular commercial high resolution design, additional fiber optics are included between the crystals and the PMT, which further degrades the available light signal.

Extracting a high fraction of the available scintillation light from the ends of long and narrow crystals proves to be very difficult due to a poor aspect ratio for light collection. The result is lower signal to noise ratios (S/N), relatively small pulse heights (reduced sensitivity), and inadequate energy resolution (reduced Compton scatter and random photon rejection capabilities). This low light extraction also contributes to non-optimized coincidence time and spatial resolution. To facilitate light collection, the crystal sides must be highly polished, which significantly increases complexity and costs.

The state of the art was advanced by the invention described in U.S. Pat. No. 6,114,703 (incorporated by reference herein) to Levin et al. The '703 patent provided an efficient method and devices for collection, and made the large surfaces of long and narrow scintillation crystals available for detection. The '703 patent disclosed methods and devices that replaced the bulky and expensive PMTs by utilizing semiconductor photodetectors, applying such semiconductor photodiodes directly to surfaces of the scintillation crystals, including at least one large surface of the scintillation crystal. The device of the '703 patent improved the amount of light measured from a scintillation event, while maintaining high spatial resolution offered by long and narrow scintillation crystals. The '703 patent also improved upon the single sheet style conventional devices that receive radiation perpendicular to the large face of the crystal sheet by eliminating the coupling losses associated with the optical interfaces between the crystal and PMT and replacing the PMT of the conventional devices with directly deposited semiconductor photodiodes.

An overriding goal in radiation imaging is to obtain reconstructed images of very high spatial resolution. Spatial resolution improvements in reconstructed images have come most often from reductions in the size and increases in the number of scintillation crystals. Detection sensitivity, though, is another limiting factor. The '703 patent was directed to improvements in the detection sensitivity. To maintain high detection sensitivity and good image quality, the challenges are to develop a finely pixellated scintillation crystal array with both high detection efficiency and high light collection. High detection efficiency means the crystals must be relatively long, tightly packed, and cover a relatively large axial field-of-view (FOV).

A difficulty with designs having small scintillation crystals for high resolution is that manufacturing is a significant challenge. It is costly and complex to handle many minute crystal elements and align them with corresponding photodetector elements. Slight misalignments might reduce light collection efficiency. A shortcoming with conventional crystal sheet devices for PET is that the sheet must be thin so that it produces a relatively narrow beam of light onto the photodetector plane. Thus, crystal sheet detectors that have been used in PET suffer from low efficiency for stopping the high energy photons.

SUMMARY OF THE INVENTION

A radiation imaging device includes scintillation crystal sheets arranged in parallel to each other. Semiconductor photodetector positional detectors read light from large faces of the scintillation crystal sheets to detect interactions in the scintillation crystal sheets and independently provide positional information concerning the interactions relative to at least one axis. The structures of the photodetectors and crystal sheets provide for very small spaces between the sheets.

DETAILED DESCRIPTION OF THE PREFERRED EMBODIMENTS

The invention relates to scintillation crystal arrays and imaging devices using scintillation crystal arrays. A scintillation crystal array of the invention increases light collection, can obtain near complete light collection, and improves detection, count efficiency, spatial resolution, and analysis of penetrating radioactive emissions. A preferred application of the invention is Positron Emission Tomography (PET).

A preferred embodiment of the invention includes an array of scintillation crystal sheets arranged in a device such that radiation is incident upon small end faces of the sheets. Semiconductor photodiodes read light from large faces of crystal sheets. The semiconductor photodiodes may be pixellated, meaning that the semiconductor photodiodes provide both detection of photons generated in the scintillation crystals and positional information about a detection, or may be one large pixel with positioning capability within that pixel In another preferred embodiment of the invention, radiation is incident perpendicular to a large face of scintillation crystals. The semiconductor photodiodes are essentially transparent to the radiation, which accordingly may pass through the face of one of the scintillation crystals of the array and into other ones of the scintillation crystals of the array. The semiconductor photodiodes are position sensitive.

Devices of the invention include high energy photon detectors or cameras for either detection, spectroscopic or imaging uses. In Nuclear Medicine, certain tissue within the body absorbs a particular radiopharmaceutical at a differential rate producing a distribution of the radioisotope. Counting the photon emissions with a tomographic array of detectors enables the creation of cross-sectional images showing a spatial distribution of how the organs and tissue utilize a particular radiopharmaceutical. The present invention is especially well-suited for Nuclear Medicine Imaging (NMI), such as gamma-ray cameras (Single Photon Emission Computed Tomography, (SPECT) or Planar Imaging or Positron Emission Tomography (PET). As an example, PET benefits from detecting with high precision the high energy photon activity of small radio-labeled structures within living subjects. Applications of high resolution PET include pharmaceutical and radio-pharmaceutical development, oncology, gene therapy and neuroscience.

Figure 1:
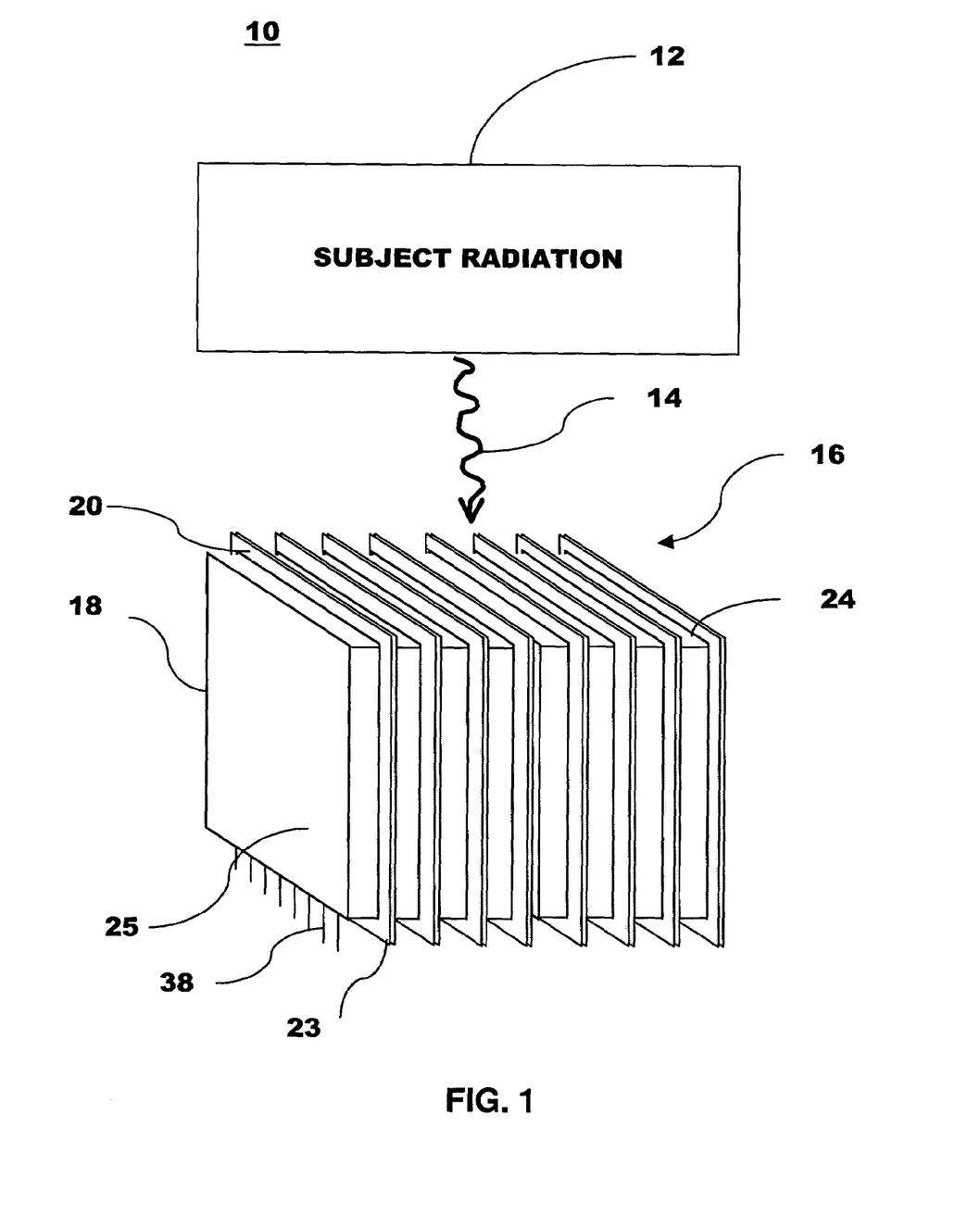
FIG. 1 is a schematic representation of a preferred embodiment PET device with a scintillation crystal array receiving photon emissions on end faces of sheet scintillation crystals.

Referring now to FIG. 1, a preferred embodiment PET device 10 is shown. A subject radiation station 12 of the device is conventional, and is not illustrated in detail. The subject radiation portion 12 may be the same or similar to commercial PET devices, such as those manufactured by GE and Seimens. The subject radiation portion 12 of the PET device produces emissions 14 that are detected by a scintillation crystal detection array 16. The scintillation crystal detection array 16 includes a plurality of thin sheets 18 of scintillation crystals and intervening semiconductor photodetector positional detectors 20. Sheet, as used herein, refers to a crystal that is optically continuous over a plurality of positions that can be detected by one or more photodetector semiconductor positional detectors. The thin sheets 18 are either continuous sheets of scintillation crystal or discrete crystals in optical contact with each other so that they share light. The semiconductor photodetector positional detectors are arranged to detect interactions producing light photons in the scintillation crystals 18, and to provide positional information concerning the location of interaction. In the FIG. 1 embodiment, detection of interaction in a particular crystal sheet 18 by a corresponding semiconductor photodetector positional detector provides positional information relative to a first axis (perpendicular to the large faces of the crystal sheets 18) and the semiconductor photodetector positional detectors themselves independently provide positional information relative to at least one second axis that is perpendicular to the first axis. Total detection information provided includes positional, temporal and spectral information.

The semiconductor photodetector positional detectors 20 comprise semiconductor photodetectors, such as lines (see, e.g., FIGS. 4 and 5), coupled to the crystal sheets 18 with or without an intermediate optical coupling compound. The photodetectors may be formed directly on the crystal sheets by conventional fabrication techniques, e.g., crystal growth from solution or melt, chemical vapor deposition, or molecular beam epitaxy or simply epoxied or otherwise attached to the sheets. Another possibility is to use a substrate 23, e.g. a thin ceramic, for structural support of the photodetectors. In the FIG. 1 embodiment, the scintillation crystal detection array 16 is arranged such that the emissions 14 are incident on a small crystal end face 24 of the crystal sheets 18. The emissions 14 are generally parallel to large faces 25 of the crystal sheets 18.

Figure 2:
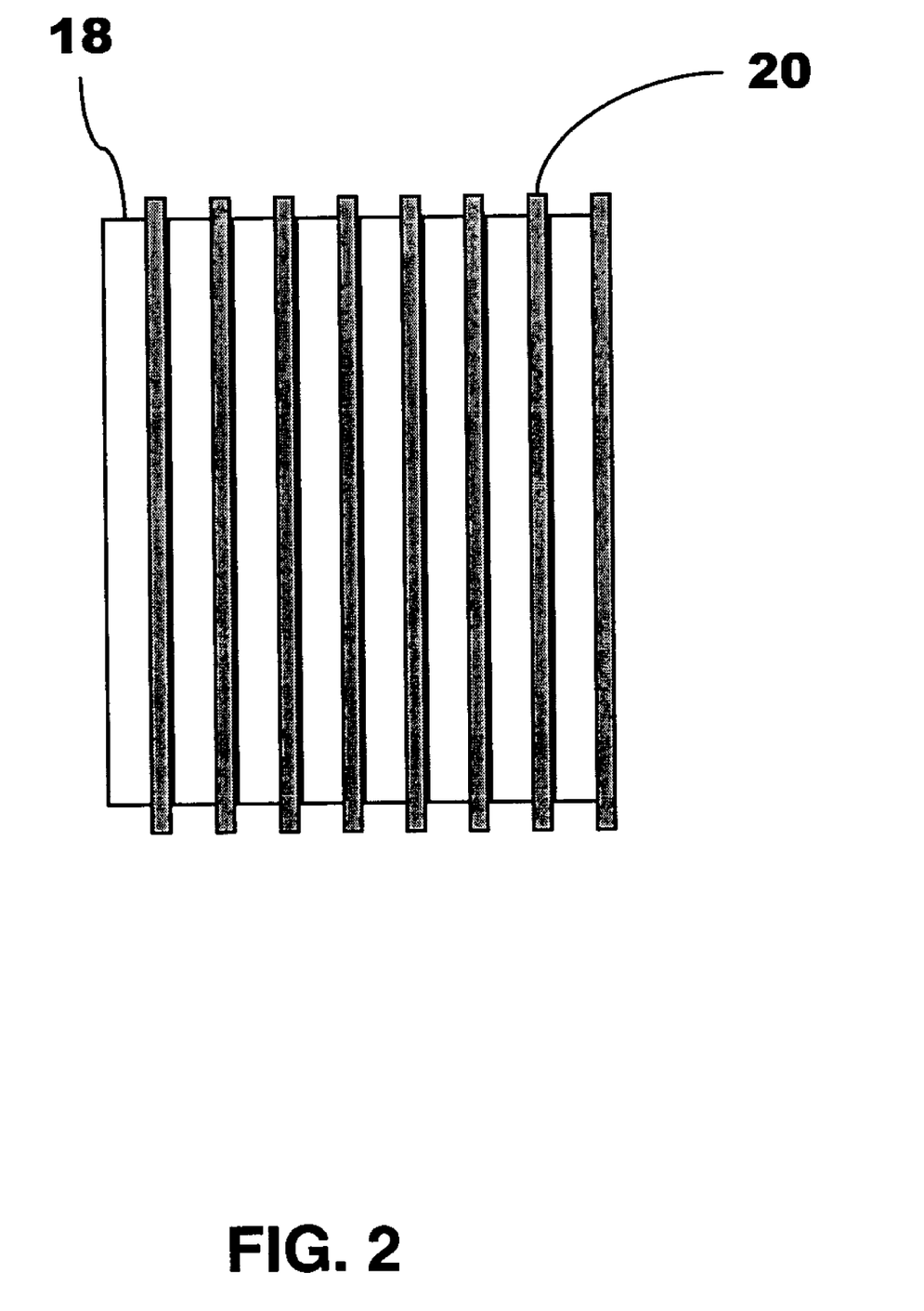
FIG. 2 is a schematic representation of a preferred embodiment scintillation crystal array.

Referring now to FIG. 2, an exemplary embodiment of an array of 1 mm thick crystal sheets 18. The crystal sheets 18, for example, dimensioned as $10 \times 10 \times 1$ mm$^3$, are advantageous compared to long and narrow crystal fingers, in that it is significantly easier and less expensive to cut larger crystal pieces and assemble them into an array. The orientation of the FIG. 1 embodiment relative to that of incoming photons (gamma radiation) is at the end faces 24 of the crystal sheets 10. Preferably, the semiconductor photodetectors are <300 μm in thickness. Using crystal sheets 18 may permit a very thin array since it may be possible to completely remove the array substrate and use the crystal instead as backing for mechanical strength to support the silicon wafer. Any type of position sensitive photodetectors with appropriate properties may be used. This includes line and square-pixel avalanche photodiode arrays, and position sensitive avalanche photodiodes. The position sensitive avalanche photodiodes are preferred as photodetector pixellation or segmentation are not required, and positional information may be extracted from only four readout channels.

Figure 3:
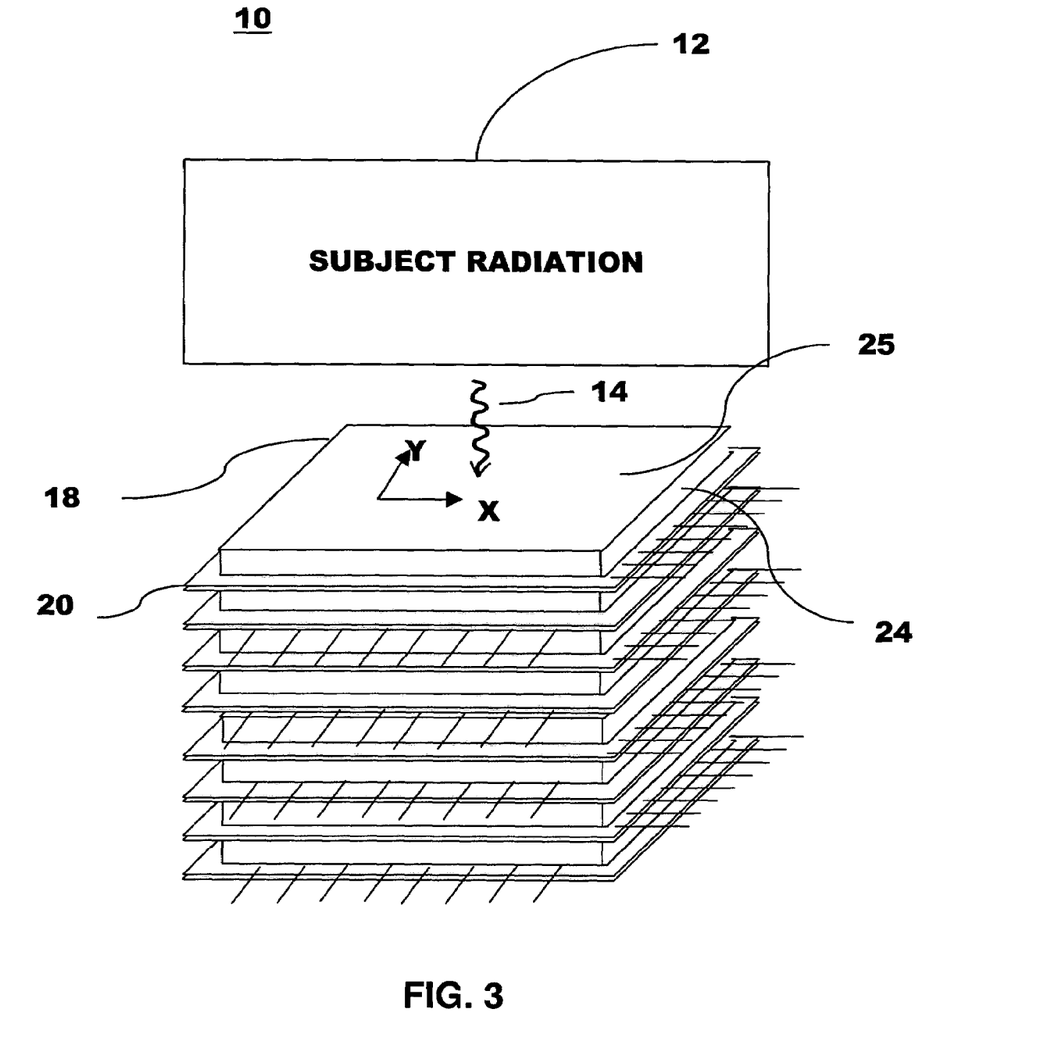
FIG. 3 is a schematic representation of a preferred embodiment PET device with a scintillation crystal array receiving photon emissions in an orthogonal direction with respect to sheet scintillation crystals in the crystal array.

Another embodiment is shown in FIG. 3. The structure of the scintillation crystal detection array 16 is similar to that in FIG. 1, but in FIG. 3 incident gamma radiation is received by a large crystal face 25 of one of the crystal sheets, i.e., generally orthogonal to the large faces of the crystal sheets 18. In this case, the semiconductor photodetector positional detectors 20 are required to independently provide positional information relative to two axes, namely an X and Y axis parallel to the large faces of the crystal sheets 18. The particular sheet 18 in which an interaction is detected provides a Z axis depth determination.

The FIG. 3 embodiment allows higher detection sensitivity since incoming photons do not see any crystal gaps, unlike in FIG. 1 where some incoming photons are incident upon spaces, though possibly very small spaces, between the individual sheets 18 of the array 16. In the FIG. 3 embodiment, the orthogonal orientation also eliminates the need to make the semiconductor photodetectors very thin. For the incident gamma radiation, silicon semiconductor photodetectors are substantially transparent, and accordingly do not adversely affect the penetration of gamma radiation photons into the crystal sheets 18.

As has been mentioned, the semiconductor photodetector positional detector in the FIGS. 1 and 3 embodiments must provide position sensitivity. The position sensitivity may be achieved by different photodetector types, arrangements and techniques. Example semiconductor photodetectors that could be used include line arrays of photodetectors, such as avalanche photodiode (APD) line arrays, or position sensitive photodetectors, such as position sensitive APDs (PSAPDs). PSAPDs have the advantage that the scintillation light pulse is positioned using only four APD signals. This would reduce the number of electronic channels in the system. Preferred exemplary photodetector arrangements are shown in FIGS. 4–6.

Figure 4:
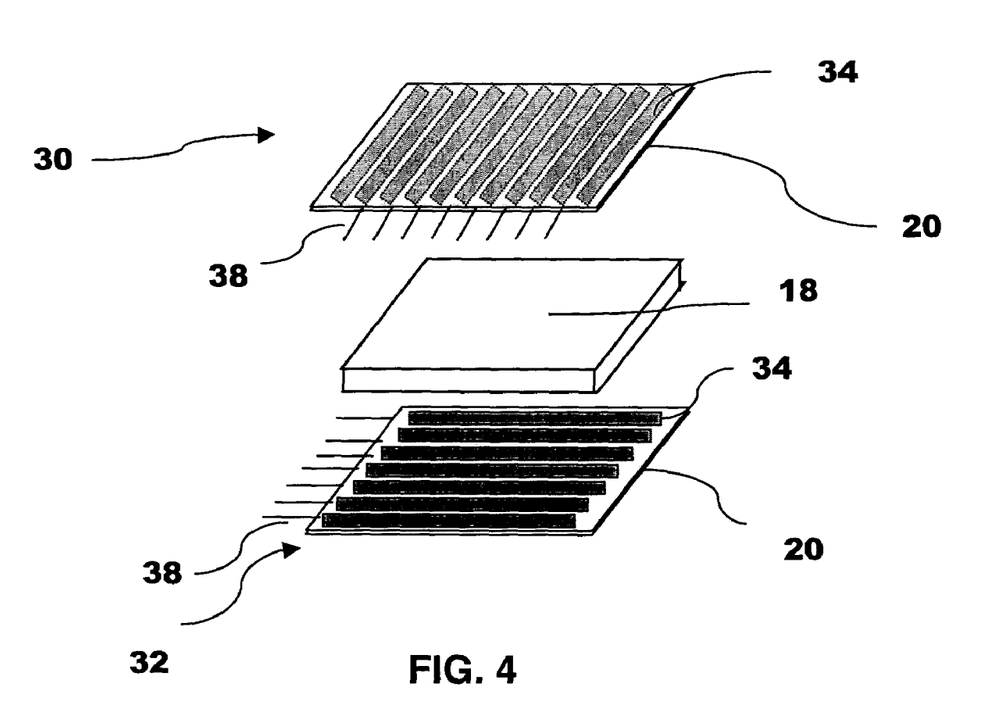
FIG. 4 is an exploded partial schematic view of a preferred embodiment scintillation crystal detection array.
Figure 5:
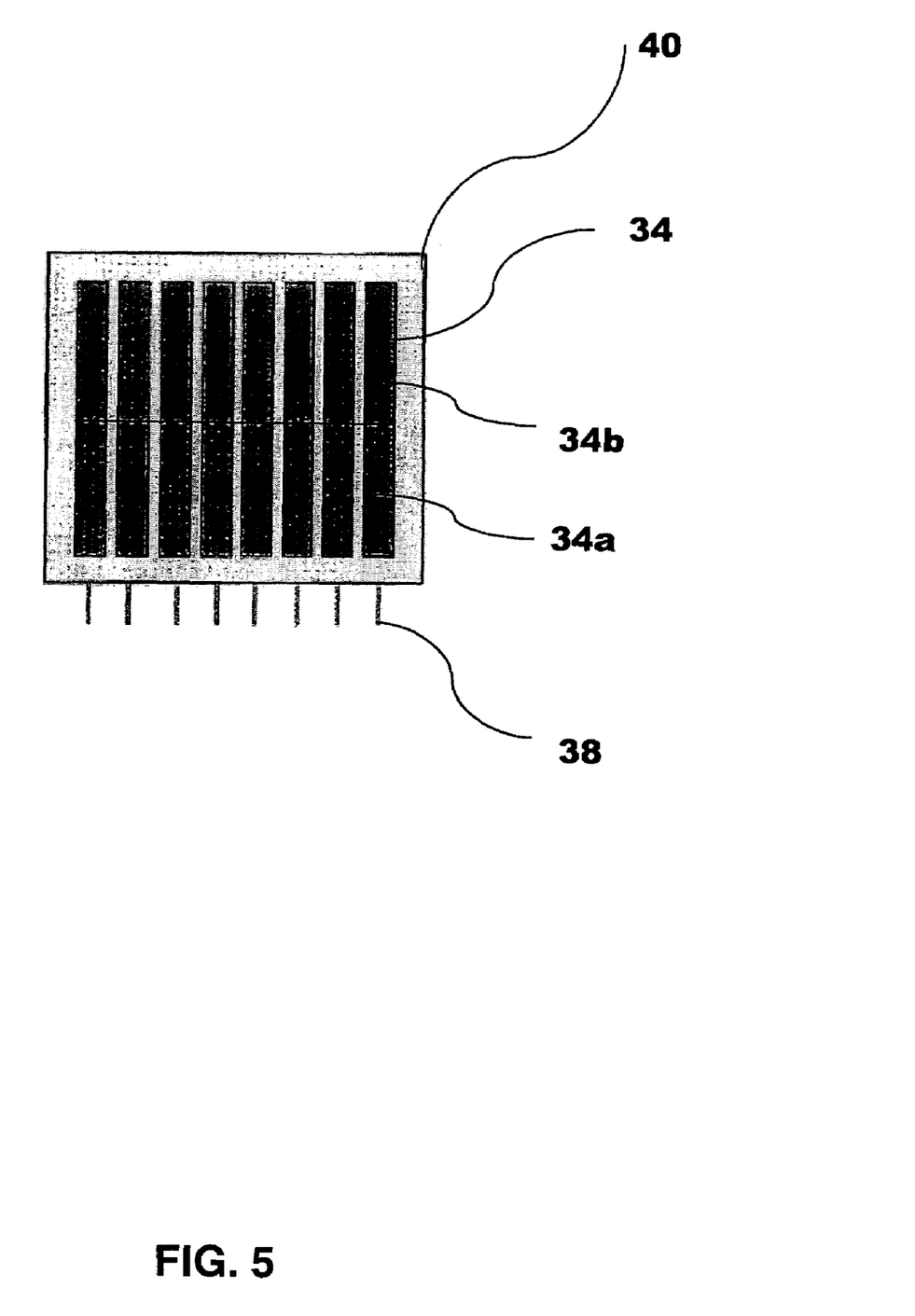
FIG. 5 is a schematic view of an avalanche photodetector line array usable in embodiments of the invention.

FIG. 4 is an exploded partial view of a scintillation crystal sheet 18 and two planes 30, 32 of APD photodetectors 34. The planes 30, 32 form alternate planes of APD line arrays oriented in the x and y direction on either side of each crystal sheet 18 in a cross-grid type readout. The position of an incident photon causing a light photon to be generated by the crystal 18 is detected by an APD 34 in each of the planes 30, 32 and a signal is provided on corresponding leads 38 to suitable processing. An interaction point in any crystal sheet plane could be determined by which cross-strip x and y elements were hit. Depth of interaction information is determined by which APD planes provide a signal. The same cross-grid style APD planes can be used in the FIG. 1 embodiment. The cross-grid arrangement would provide information about the depth of interaction in the FIG. 1 embodiment.

The FIG. 1 embodiment may simply use APD line arrays that are parallel to the path of incident radiation, though the depth of interaction may or may not be provided. An example APD line array 40 is shown in FIG. 5, and includes a plurality of APD line detectors 34 spaced apart from each other. Each provides a signal to a corresponding electronic lead 38. With the line array 40 replicated between each crystal sheet 18, X and Y positional information is provided. The resolution along one axis is determined by the pitch of the APD line detectors 34 and the resolution along another axis is determined by the location of the crystal layers 18. It is also possible to use APD line elements that are segmented along the length of each element as depicted in FIG. 5. The signals from the different segments 34a, 34b coarsely provide the interaction depth location. A segmented APD would provide the X and Y positional information directly. Another possibility is a multiplexing scheme in which the elements 34 are all connected through resistive division so that only a few (e.g. 4) readout signals are required.

Figure 6:
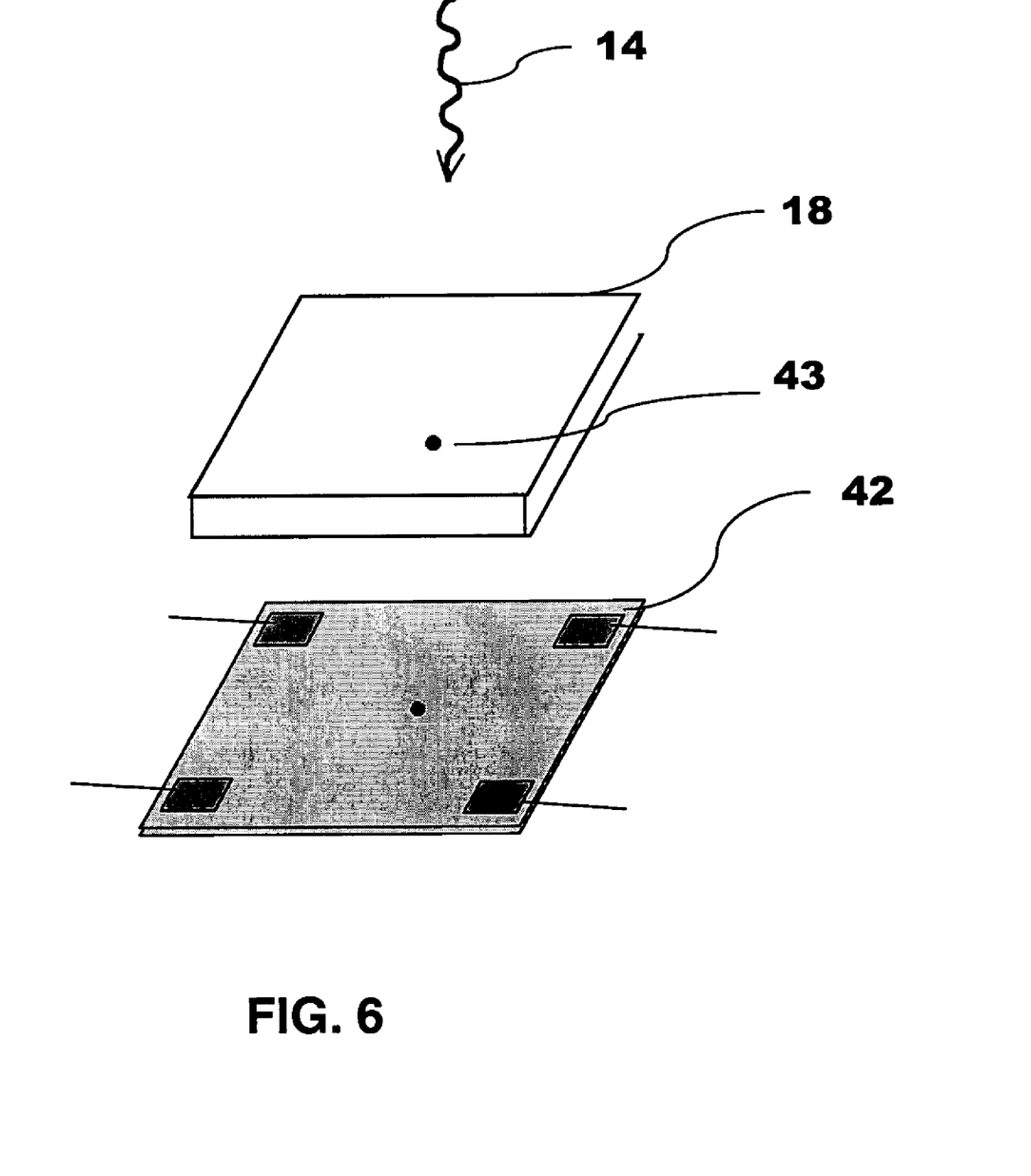
FIG. 6 is an exploded partial schematic view of a preferred embodiment scintillation crystal detection array.

FIG. 6 illustrates an embodiment that uses a PSAPD 42 between each crystal sheet 18. FIG. 6 indicates the orthogonal orientation of FIG. 3, but the orientation of FIG. 1 may also use a PSAPD for the semiconductor photodetector positional detectors 20. A PSAPD as shown in FIG. 6 is able to position a photon interaction 43 using only four PSAPD signals. When applied to either of the FIGS. 1 and 3 embodiments, both X and Y positional information and depth of interaction information is provided automatically without any physical segmentation of photodetector elements.

Figure 7A:
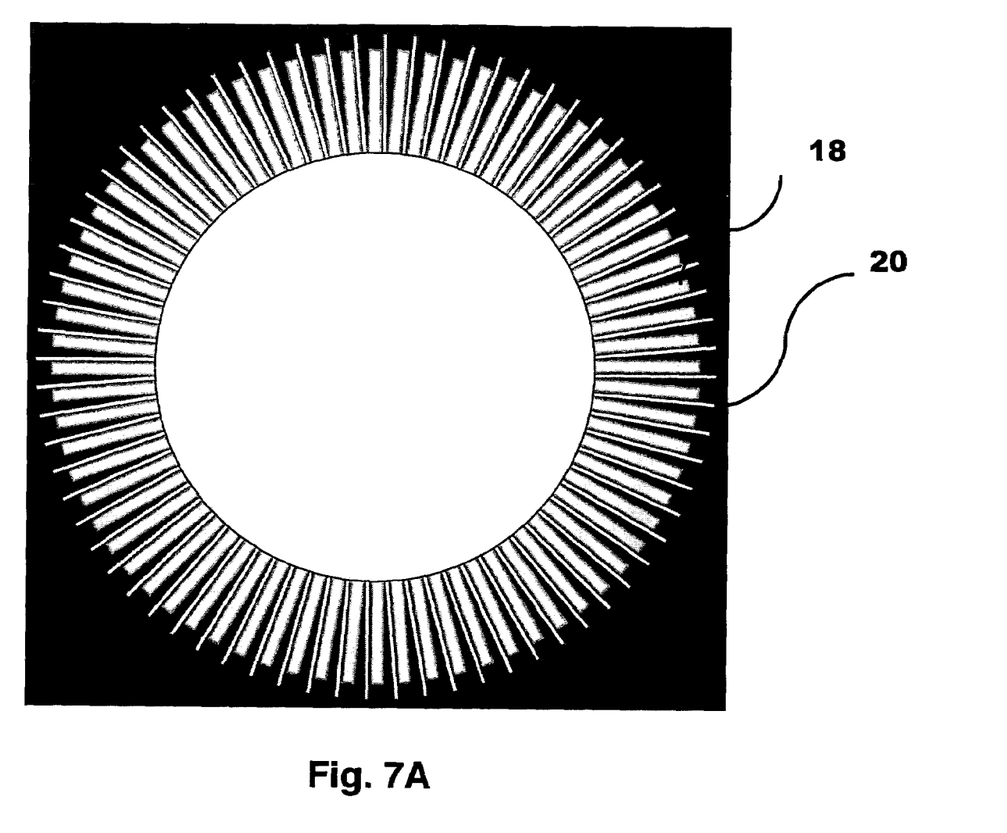
FIGS. 7A and 7B show preferred embodiment scintillation crystal detection array arranged as a ring, and an associated photodetector array component, respectively.
Figure 7B:
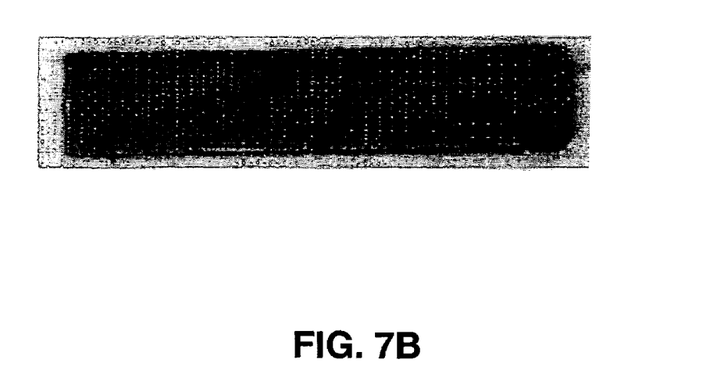

FIGS. 7A and 7B show a preferred embodiment scintillation crystal detection array 16 arranged as a ring, with individual crystal sheets 18 receiving radiation at their small ends. Intervening photodetector positional detectors 20, for example the APD line array of FIG. 7B detect light photons produced by interactions in the crystal sheets. The FIGS. 7A and 7B embodiment with a relatively wide APD line array, e.g., 4 cm, provides relatively large axial coverage (4 cm). This axial field of view could cover a large fraction of the length of a small animal subject, e.g., a mouse, or a body portion, e.g., a hand, for high sensitivity imaging. Currently silicon technology allows arrays as wide as 6 cm. If a longer axial dimension is desired in 7A, multiple rings of detectors may be pieced together.

Figure 8:
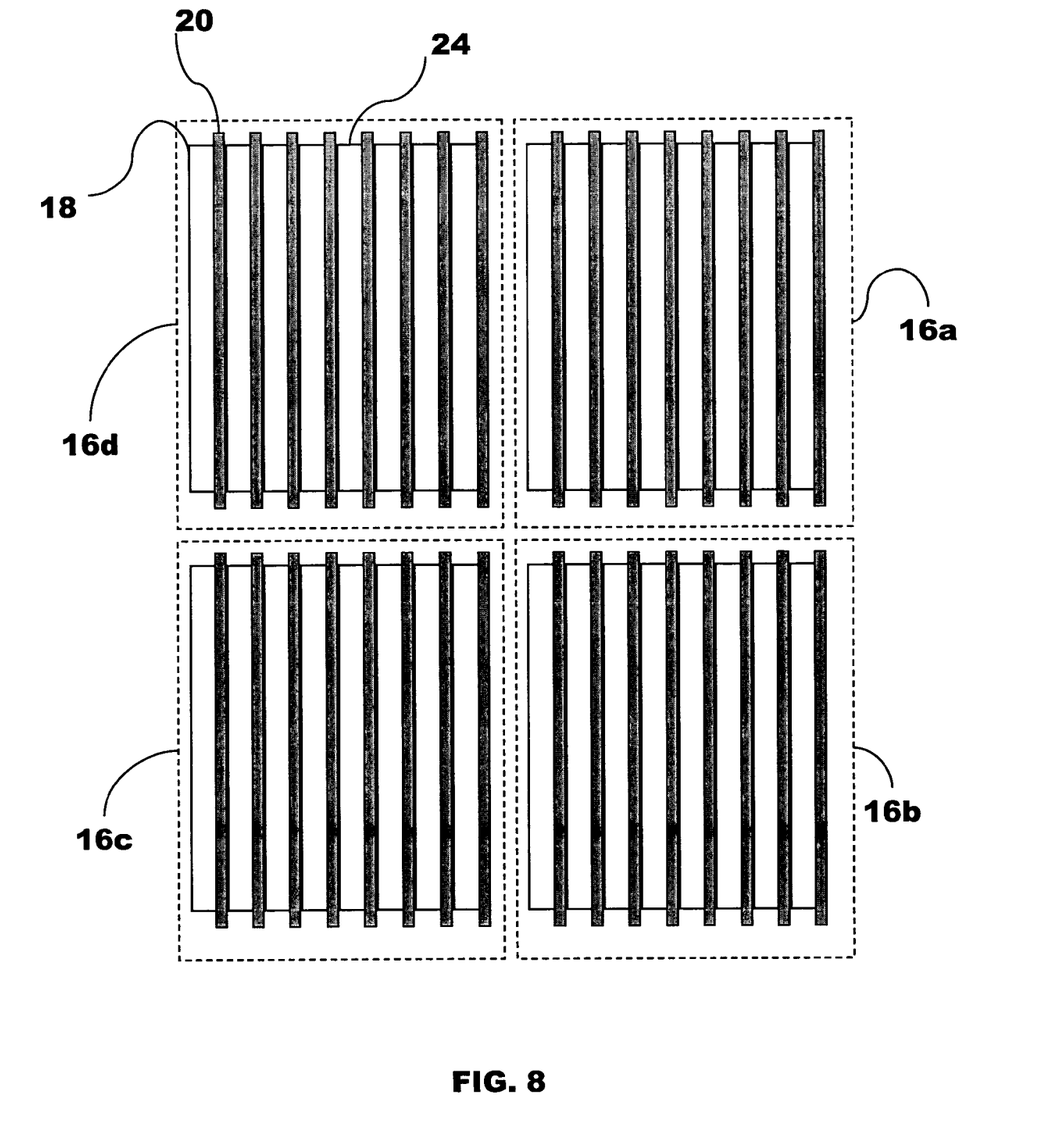
FIG. 8 shows a preferred embodiment modular mosaic scintillation crystal detection area for imaging large area portions.
Figure 9A:
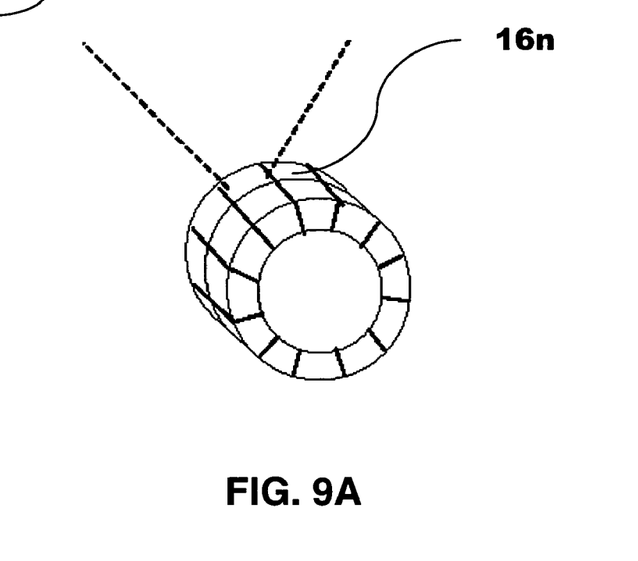
FIGS. 9A and 9B illustrate a preferred modular scintillation crystal array having modules arranged in multiple rings.
Figure 9B:
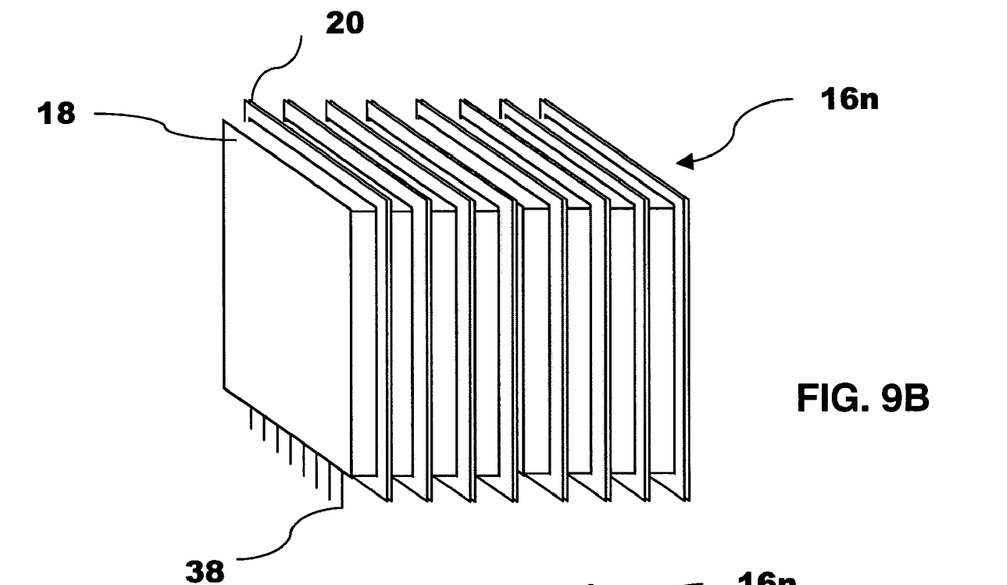

FIG. 8 shows another scintillation crystal detection array, for imaging large area portions, e.g., human breast examinations. A large area may be covered in the example of FIG. 8 by tiling together multiple array modules. FIG. 8 represents four scintillation crystal detection array modules 16a, 16b, 16c, and 16d. The modules can be arranged in a planar mosaic pattern as shown in FIG. 8 to image a large area. The FIG. 8 embodiment is a planar detector arrangement with emissions incident on ends 24 of crystal sheets 18 as in the FIG. 1 embodiment. Modules 16n may also be arranged in multiple rings to form a cylinder to cover a large axial area, as shown in FIGS. 9A and 9B. This arrangement, with a large number of modules, may also be expanded to a sufficient diameter cylinder to image large subjects. Leads 38 may be exposed, for example, on an outer circumference of the rings of modules 16n.

To study signal to noise ratio capability, light collection from a large face of a thin, 10×10×1 mm$^3$ LSO crystal sheet was studied. Point light sources were simulated at the center and edge of the large area of a crystal sheet. For these central and edge locations, three different source distances were simulated with respect to the photodetector plane as shown: a top position corresponded to ~0.1 mm from the top face as shown, a middle position to the crystal center, and a bottom position to ~0.1 mm from the bottom plane where the photodetector is coupled. The total light collection from the large face was nearly complete independent of crystal surfaces and source position.

Figure 10A:
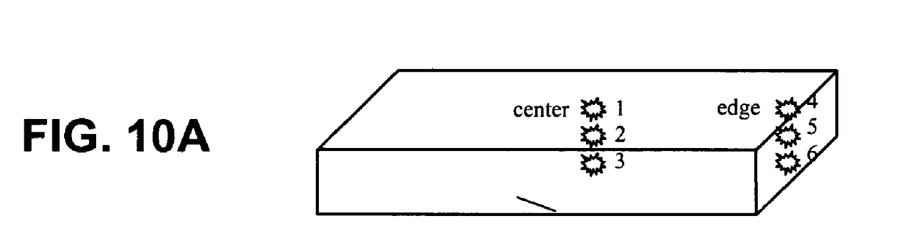
FIGS. 10A and 10B show simulated light distributions at a photodetector plane for a scintillation crystal sheet.
Figure 10B:
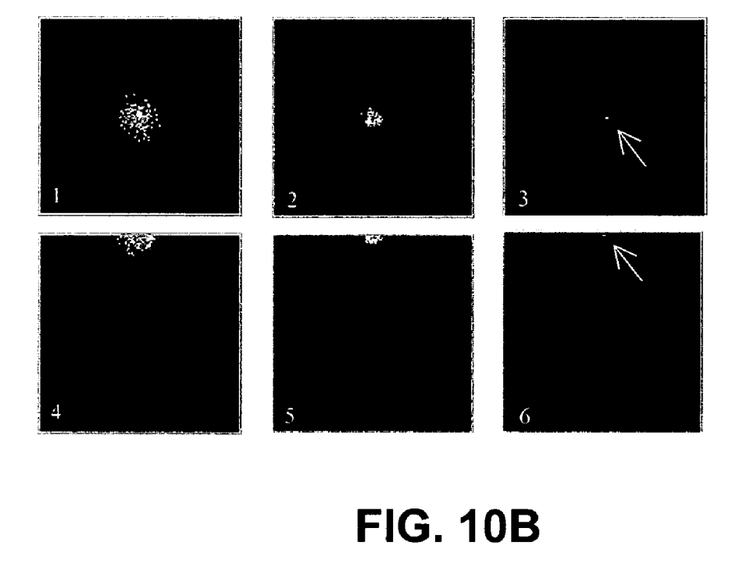

The simulated light distributions seen at the photodetector plane are shown in FIGS. 10A and 10B. For source positions very close to the photodetector plane, the exiting light distribution is extremely narrow (see arrows). This is due to the fact that the cone of refracted light ($\theta_i < \theta_c$) subtended from the light origin to the crystal bottom plane and exiting the crystal on first pass, and that light cone which reflects off the top and subsequently exits the bottom surface are narrower for closer distances to the photodetector surface. Thus, the base of the detected light cone will also be narrow. The light rays that undergo total internal reflection ($\theta_i > \theta_c$) will for the most part be trapped within the crystal and not contribute significantly to the tails of the distribution.

Figure 11A:
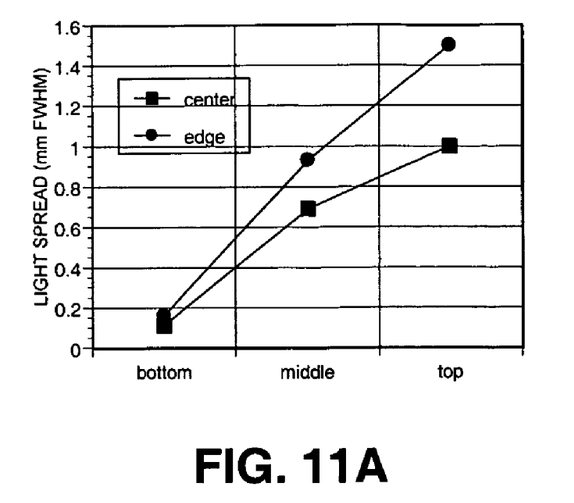
FIGS. 11A and 11B show extracted FWHM values and a sample fit (for distribution 5 of FIG. 10B).
Figure 11B:
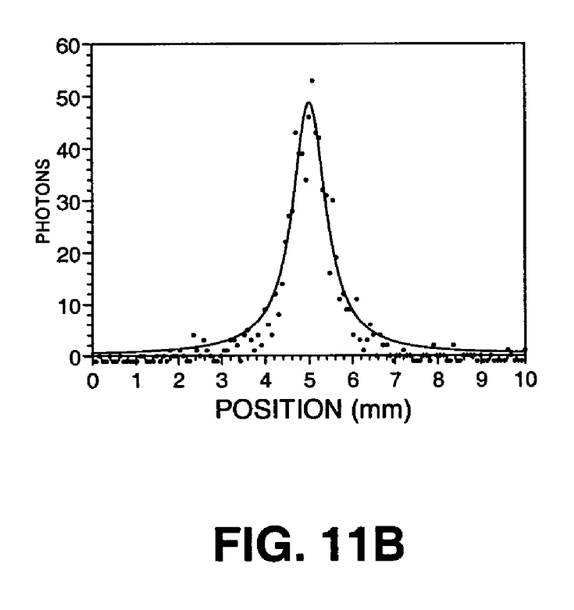

Light distribution shapes were quantified by fitting horizontal profiles through the center of the light distributions shown in FIG. 10B to a Lorentzian function:

$$f(x) = Aw/[(x-x_0)^2 + (w/2)^2)],$$

where $x_0$ and $w$ respectively, are the peak location and full-width-at-half-maximum (FWHM) of the distribution $f(x)$. The extracted FWHM values and a sample fit (distribution 5 of FIG. 10B) are shown in FIGS. 11A and 11B. The results in FIGS. 11A and 11B indicate that the FWHM of the light spread profiles typically do not extend more than 1 mm laterally, with the broadest spread (1.5 mm FWHM) occurring when the light is created 1 mm (the furthest distance possible) from the photodetector face. In all cases, at least 90% of the light is contained within 3 mm laterally. For example using a line array with 1 mm wide line array pixels, this suggests that only three APD elements may be necessary to collect a high fraction of the available light created within a crystal sheet. An event could be positioned using a weighted mean on only three signals, avoiding excessive uncorrelated noise propagation, or by selecting the pixel with maximum signal. With a weighted mean approach, resolution would be less than the pixel width. Thus, this experiment indicates that there would be nearly optimal light collection. Of course, with a different photodetector, different positioning characteristics would result.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A radiation imaging device, comprising:
   a subject radiation station producing photon emissions; and
   a scintillation crystal detection array arranged to receive emissions from said subject radiation station, the scintillation crystal detection array having a plurality of crystal sheets and intervening semiconductor photodetector positional detectors, the semiconductor photodetector positional detectors having semiconductor photodetectors reading light from a large face of a corresponding crystal sheet;
   wherein said scintillation crystal detection array arranged to receive the emissions in a direction incident to large faces of said crystal sheets;
   wherein said intervening semiconductor photodetector positional detectors comprise photodetector line arrays.

2. The device of claim 1, wherein alternating ones of said intervening semiconductor photodetector positional detectors are oriented to form a cross grid arrangement of the photodetector line arrays.

3. A radiation imaging device, comprising:
a subject radiation station producing photon emissions; and
a scintillation crystal detection array arranged to receive emissions from said subject radiation station, the scintillation crystal detection array having a plurality of crystal sheets and intervening semiconductor photodetector positional detectors, the semiconductor photodetector positional detectors having semiconductor photodetectors reading light from a large face of a corresponding crystal sheet;
wherein said scintillation crystal detection array arranged to receive the emissions in a direction incident to large faces of said crystal sheets;
wherein said intervening semiconductor photodetector positional detectors comprise segmented photodetector line arrays.

4. A radiation imaging device, comprising:
a subject radiation station producing photon emissions; and
a scintillation crystal detection array arranged to receive emissions from said subject radiation station, the scintillation crystal detection array having a plurality of crystal sheets and intervening semiconductor photodetector positional detectors, the semiconductor photodetector positional detectors having semiconductor photodetectors reading light from a large face of a corresponding crystal sheet;
wherein said scintillation crystal detection array is arranged to receive the emissions by end faces of said crystal sheets in a direction incident to the end faces of said crystal sheets;
wherein said intervening semiconductor photodetector positional detectors comprise photodetector line arrays.

5. The device of claim 4, wherein alternating ones of said intervening semiconductor arrays are oriented to form a cross grid arrangement of the photodetector line arrays.

6. The divice of claim 4, wherein said intervening semiconductor photodetector positional detectors comprise segmented photodetector line array.

7. A radiation imaging device, comprising:
a subject radiation station producing photon emissions; and
a scintillation crystal detection array arranged to receive emissions from said subject radiation station, the scintillation crystal detection array having a plurality of crystal sheets and intervening semiconductor photodetector positional detectors, the semiconductor photodetector positional detectors having semiconductor photodetectors reading light from a large face of a corresponding crystal sheet;
wherein said intervening semiconductor photodetector positional detectors have a thickness of $\leq 300 \mu m$.

8. The device of claim 7, wherein said intervening semiconductor photodetector positional detectors comprise semiconductor photodetectors supported by one of said plurality of said crystal sheets, said crystal sheets forming a substrate.

9. The method of claim 7, wherein said intervening semiconductor photodetectors are each supported by a substrate.

10. The device of claim 7, wherein said plurality of crystal sheets and said intervening semiconductor photodetector positional detectors are arranged in a ring.

11. The device of claim 7, said scintillation crystal detection array forming one of a plurality of scintillation crystal detection arrays, each forming one of a plurality of modules.

12. The device of claim 11, wherein said modules are arranged in a linear mosaic.

13. The device of claim 11, wherein said modules are arranged in a ring.

14. The device of claim 13, said ring comprising one of a plurality of rings to form a cylinder, with leads from said scintillation crystal detection arrays extending from an outer circumference of said cylinder.

15. A radiation imaging device, comprising:
a subject radiation station producing photon emissions: and
a scintillation crystal detection array arranged to receive emissions from said subject radiation station, the scintillation crystal detection array having a plurality of crystal sheets and intervening semiconductor photodetector positional detectors, the semiconductor photodetector positional detectors having semiconductor photodetectors reading light from a large face of a corresponding crystal sheet:
wherein said intervening semiconductor photodetector positional detectors comprise semiconductor photodetectors formed directly on one of said plurality of said crystal sheets, said crystal sheets forming a substrate.

16. A radiation imaging device, comprising:
a subject radiation station producing photon emissions: and
a scintillation crystal detection array arranged to receive emissions from said subject radiation station, the scintillation crystal detection array having a plurality of crystal sheets and intervening semiconductor photodetector positional detectors, the semiconductor photodetector positional detectors having semiconductor photodetectors reading light from a large face of a corresponding crystal sheet:
wherein said intervening semiconductor photodetectors are each supported by a thin ceramic substrate.

17. A radiation imaging device, comprising:
scintillation crystal sheets arranged in parallel to each other;
semiconductor photodetector positional detectors reading light from large faces of said scintillation crystal sheets to detect interactions in said scintillation crystal sheets and independently provide positional information concerning the interactions relative to at least one axis;
wherein said semiconductor photodetector positional detectors have a thickness of $\leq 300 \mu m$.

18. A radiation imaging device, comprising:
scintillation crystal sheets arranged in parallel to each other;
semiconductor photodetector positional detectors reading light from large faces of said scintillation crystal sheets to detect interactions in said scintillation crystal sheets and independently provide positional information concerning the interactions relative to at least one axis;
wherein alternating ones of said semiconductor photodetector positional detectors are oriented to form a cross grid arrangement.

19. A radiation imaging device, comprising:
scintillation crystal sheets arranged in parallel to each other;
semiconductor photodetector positional detectors reading light from large faces of said scintillation crystal sheets to detect interactions in said scintillation crystal sheets and independently provide positional information concerning the interactions relative to at least one axis;

wherein said semiconductor arrays comprise semiconductor photodetectors supported by a thin ceramic substrate.

20. A radiation imaging device, comprising:
scintillation crystal sheets arranged in parallel to each other;
semiconductor photodetector positional detectors reading light from large faces of said scintillation crystal sheets to detect interactions in said scintillation crystal sheets and independently provide positional information concerning the interactions relative to at least one axis
wherein said semiconductor photodetector positional detectors are formed directly on corresponding large faces of said scintillation crystal sheets.

* * * * *

UNITED STATES PATENT AND TRADEMARK OFFICE
CERTIFICATE OF CORRECTION

| | | |
|---|---|---|
| PATENT NO. | : 7,049,600 B2 | Page 1 of 1 |
| APPLICATION NO. | : 10/664768 | |
| DATED | : May 23, 2006 | |
| INVENTOR(S) | : Craig S. Levin | |

It is certified that error appears in the above-identified patent and that said Letters Patent is hereby corrected as shown below:

In the Issued Patent:

Col. 5, line 63, please delete "< 300 µm" and insert --≤ 300 µm-- therefor.

Signed and Sealed this

Nineteenth Day of September, 2006

JON W. DUDAS
*Director of the United States Patent and Trademark Office*